United States Patent [19]

Meddings

[11] Patent Number: 4,709,148

[45] Date of Patent: Nov. 24, 1987

[54] QUADRUPOLE MASS SPECTROMETERS

[75] Inventor: Basil Meddings, Edmonton, Canada

[73] Assignee: Sherritt Gordon Mines Limited, Toronto, Canada

[21] Appl. No.: 824,823

[22] Filed: Jan. 31, 1986

[30] Foreign Application Priority Data

Feb. 7, 1985 [GB] United Kingdom ................. 8503125

[51] Int. Cl.[4] ............................................. B01D 59/44

[52] U.S. Cl. ..................................... 250/292; 250/281

[58] Field of Search ............... 250/281, 282, 292, 288; 315/116, 117

[56] References Cited

U.S. PATENT DOCUMENTS 2,425,657 8/1947 Tunick ............................... 315/116

2,732,418 1/1956 Lindley .............................. 315/116

3,059,164 10/1962 Johnson ............................. 315/117

3,536,952 10/1970 Findley .............................. 315/117

*Primary Examiner*—Bruce C. Anderson

*Attorney, Agent, or Firm*—Robert F. Delbridge; Arne I. Fors

[57] ABSTRACT

A quadrupole mass spectrometer has a housing containing pole rods which define a passage through which ions can pass when the housing is evacuated. RF voltage is supplied to the pole rods to cause ions only of a predetermined mass/charge ratio to pass through the passage. Such ions are detected and their rate of receipt is inducted. The temperature of the RF supply is controlled to enable more consistent analytical results to be attained.

5 Claims, 7 Drawing Figures

QUADRUPOLE MASS SPECTROMETERS

Figure 1:
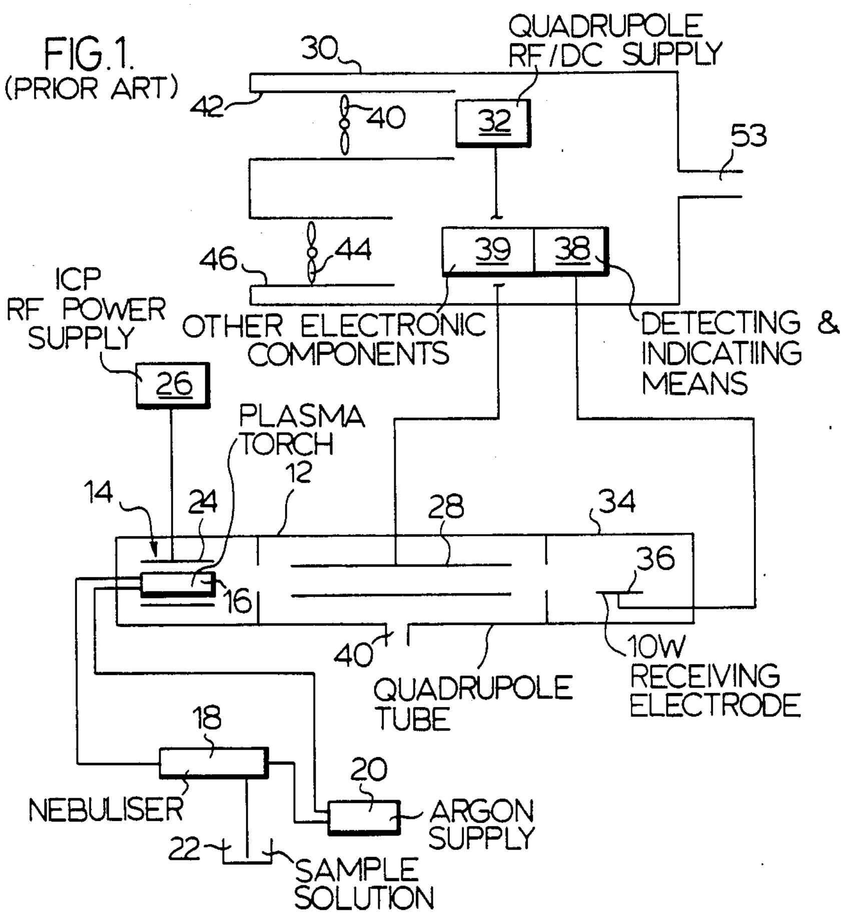
FIG.1. (PRIOR ART)

This invention relates to quadrupole mass spectrometers, for example inductively coupled plasma mass spectrometers of this kind.

In a quadrupole mass spectrometer, a combination of RF and DC electric fields is applied to pole rods in an evacuated tube to allow only ions of a specific mass/-charge ratio to pass through a passage defined by the pole rods. Such spectrometers have commonly been used in the past to identify compounds, i.e. qualitative analysis. Recently, with the advent of inductively coupled plasma (ICP) mass spectrometers, attempts have been made to use ICP quadrupole mass spectrometers for elemental quantitative analysis. However, it has been found that spectrometers of this kind constructed in accordance with known teachings have not proved to be sufficiently precise for this purpose. Relative Standard Deviation (RSD) of not greater than about 3% is frequently required, and for some analysis work it is necessary that the RSD be not greater than about 1%. Present ICP quadrupole mass spectrometers have not been able to achieve this precision.

The present invention is based on the discovery that, for acceptable analytical precision, it is necessary to control the temperature of the electronic circuitry providing the electric fields applied to the pole rods.

For example, with one instrument, it was found that analyses of the quantity of an element in a solution varied by 20% for a 1° C. change in room temperature. Thus, this implies that to achieve 1% RSD, the temperature should not vary by more than 0.05° C. Although this could be done by controlling room (ambient) temperature to such accuracy, this is not always practically possible.

It was found that variations in the temperature of the air cooling the RF generator (which supplies RF power to the pole rods) resulted in rapid and marked effects in the analytical results. In accordance with the invention, the temperature of the air passing over the RF generator is suitably controlled, for example to ±0.05° C., by means of a heat exchanger at the intake of a fan supplying cooling air to the RF generator. Air leaving the RF generator is usually warmer by about 5° to 20° C. than the incoming air, and in accordance with another feature of the invention, this heated air is exhausted directly to the ambient atmosphere without passing over other electronic components (such as electrode bias supplies) in the instrument, for example by separating the RF generator by means of a partition from the other electronic components which are usually contained in a general electronics cabinet.

In accordance with yet another feature of the invention, the temperature of air passing over other electronic components is also suitably controlled, for example to ±0.05° C., by means of another heat exchanger at the intake of a fan supplying cooling air to the other electronic components.

After modifying a known instrument in the manner described above, it was found that the percentage RSD for the instrument was about 1.0, which was acceptable.

According to the present invention therefore, a quadrupole mass spectrometer comprises a housing containing pole rods defining a passage through which ions can pass when the housing is evacuated, means for supplying ions to said passage, RF voltage supply means for supplying RF voltage to said pole rods to cause ions only of a predetermined mass/charge ratio to pass through said passage, means for receiving ions which have passed through said passage, electrical means for detecting and indicating the rate of receipt of ions of said predetermined mass/charge ratio by said ion receiving means, and means for controlling the temperature of said RF supply means.

The temperature control means may comprise means for passing air at a predetermined temperature over said RF supply means. The quadrupole mass spectrometer may also comprise second air flow means separate from the first air flow control means for passing air at a predetermined temperature over other electronic components.

Advantageously, the temperature control means controls the temperature of air passing over said RF supply means to within ±0.05° C. of a predetermined temperature.

The means for supplying ions to said tubular means may comprise inductively coupled plasma supply means.

Figure 1A:
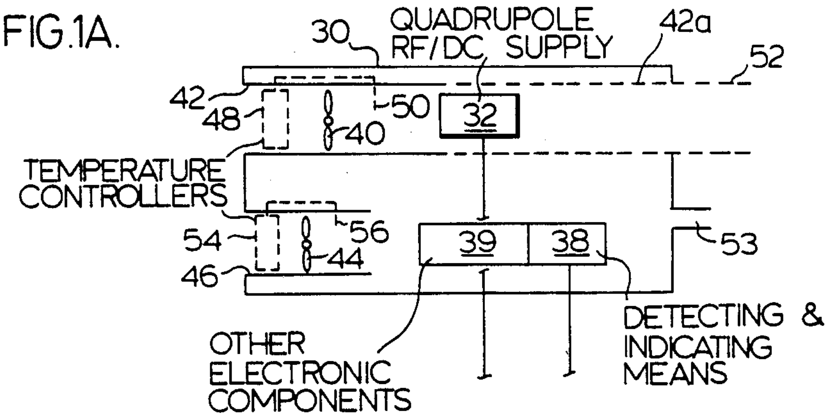
Figure 2:
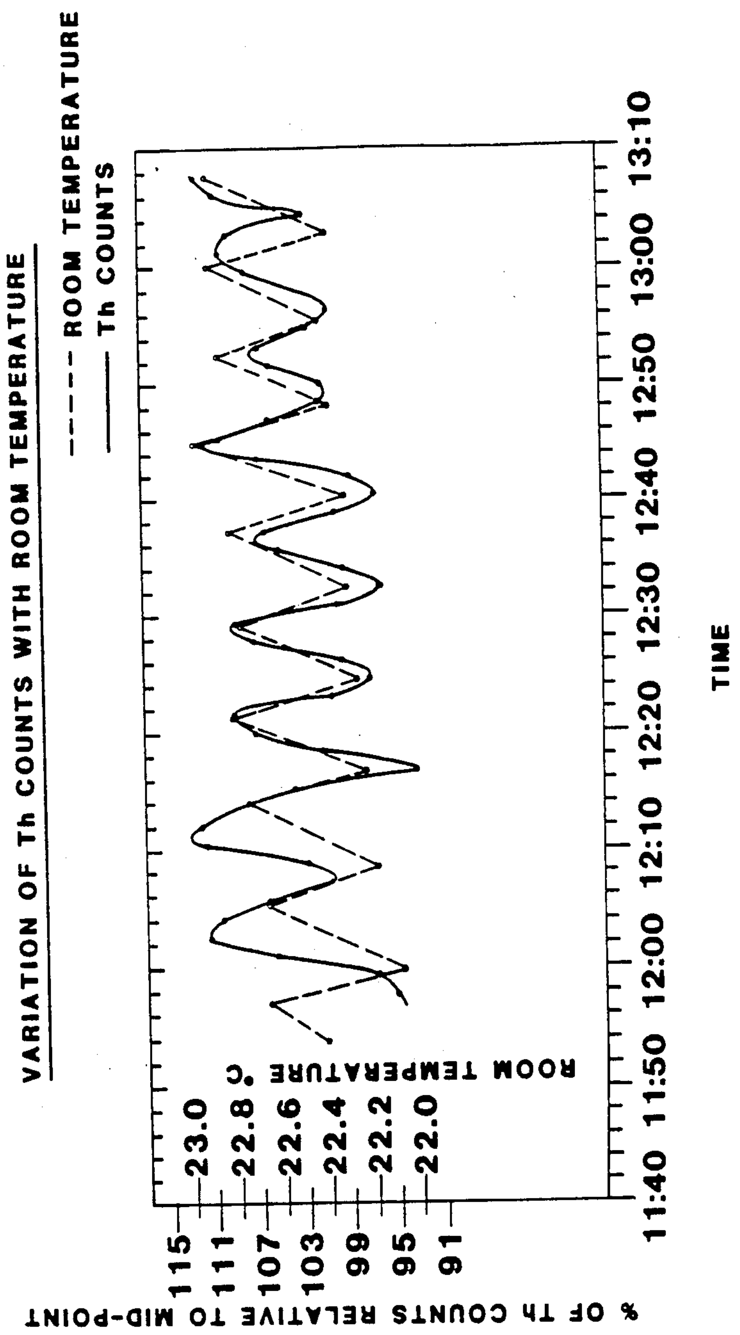
Figure 3:
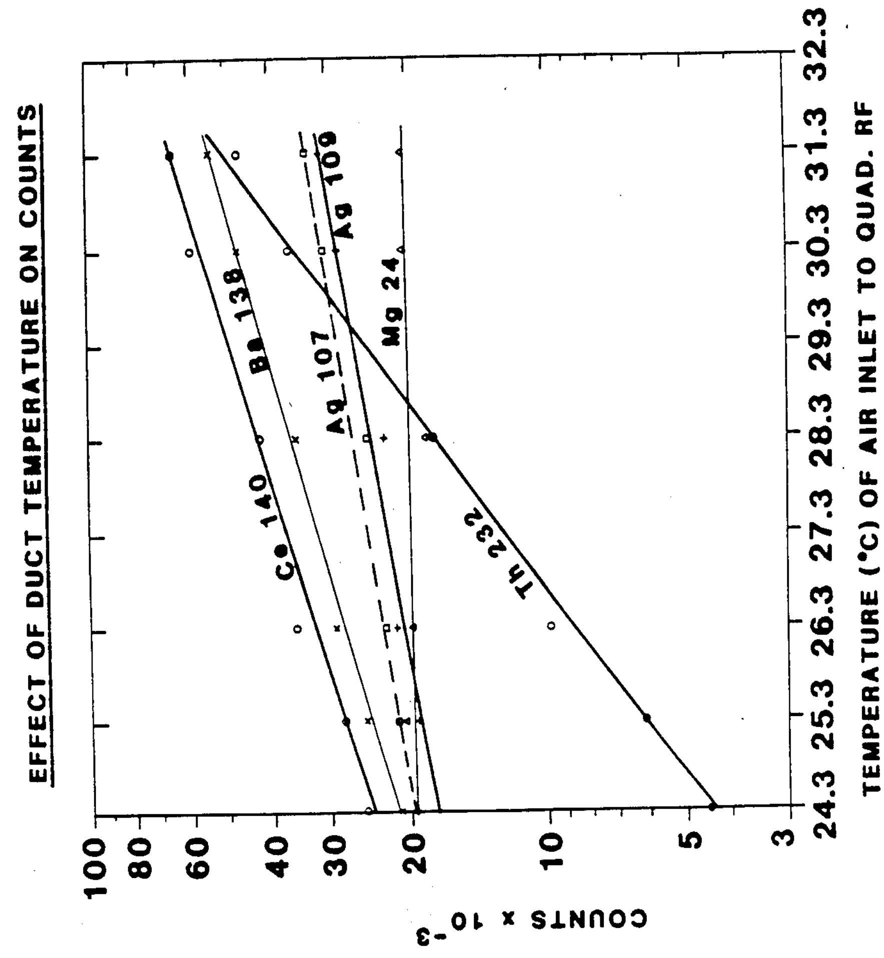
Figure 4:
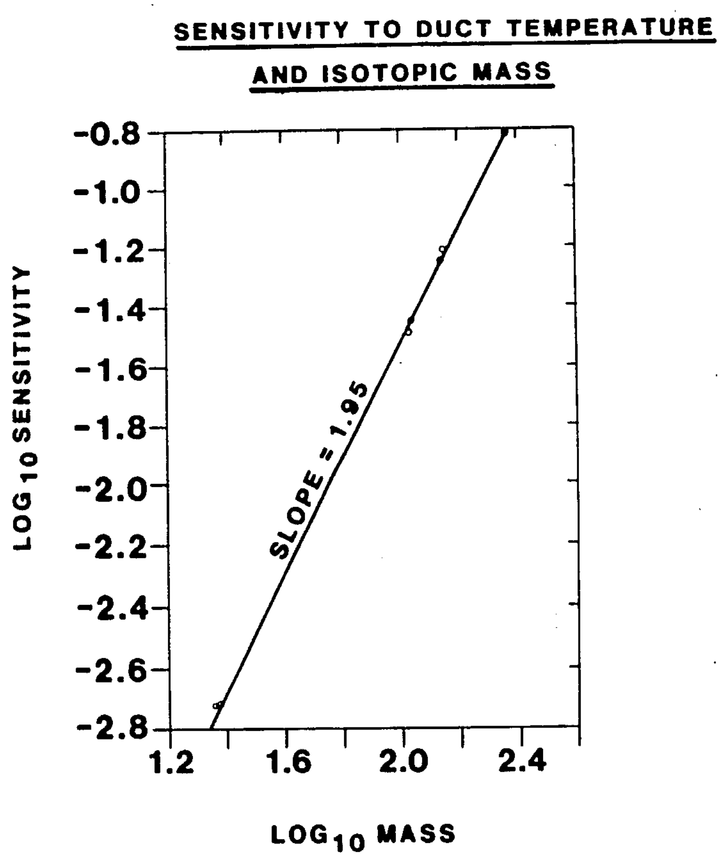
Figure 5:
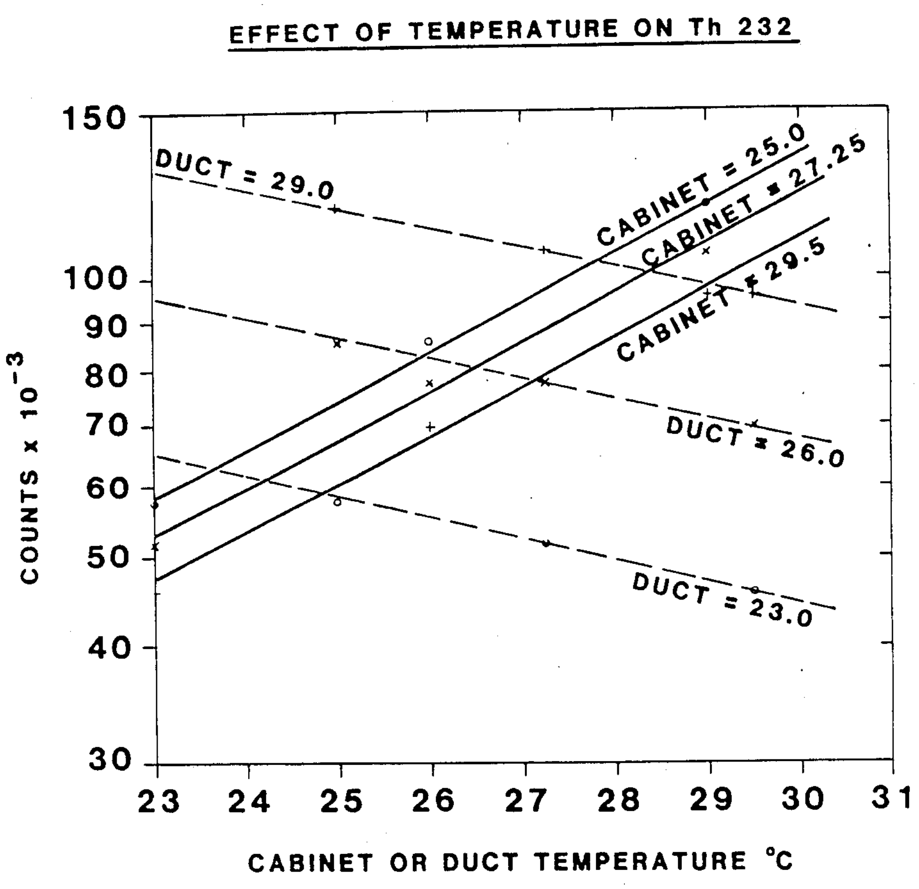
Figure 6:
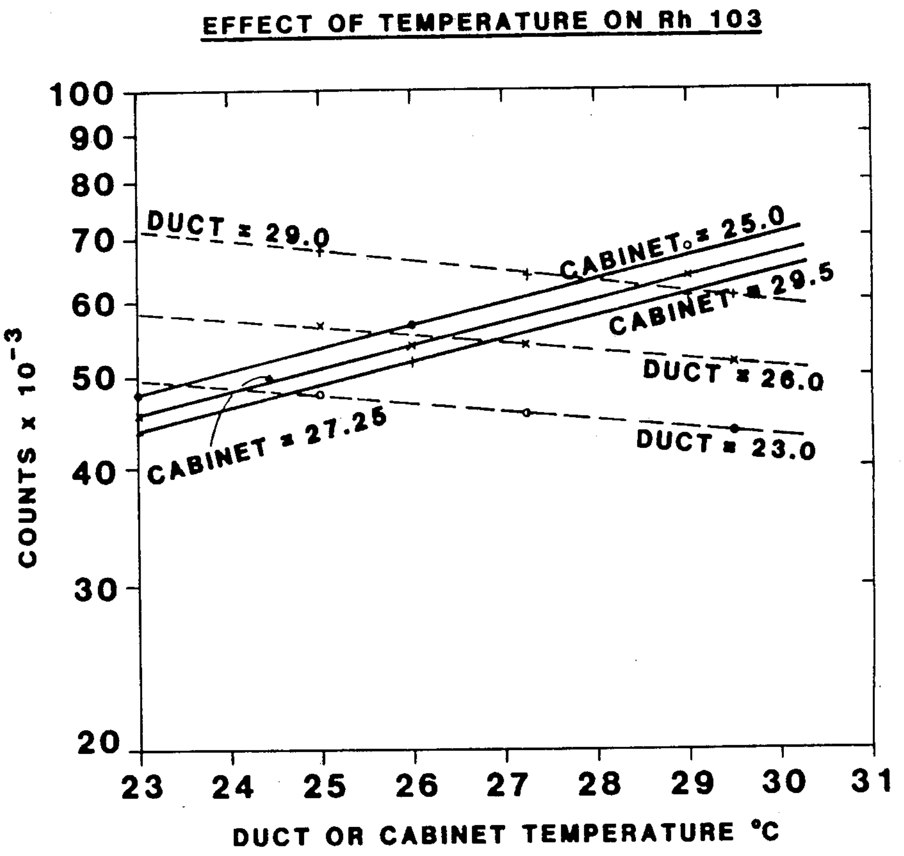

Embodiments of the invention will now be described, by way of example, with reference to the accompanying drawings, of which:

FIG. 1 is a diagrammatic view of a known ICP quadrupole mass spectrometer,

FIG. 1A is a similar view but showing modifications made in accordance with the invention, FIG. 2 is a graph showing variation of Thorium count with room temperature of a 90 minute period, FIG. 3 is a graph showing how counts for various elements vary with temperature changes in cooling air supplied to the quadrupole RF power supply, FIG. 4 is a graph showing the linear slope of the logarithm of temperature sensitivity plotted against the lorarithm of isotope mass, FIG. 5 is a graph showing variation of Thorium counts with temperature changes in cooling air supplied to the quadrupole RF power supply, and temperature changes in cooling air supplied to other electronic components, and FIG. 6 is a similar graph but showing variations in Rhodium counts with the same temperature variations.

Referring first to FIG. 1 of the accompanying drawings, an inductively coupled plasma quadrupole mass spectrometer comprises a quadrupole tube 12 having an inductively coupled plasma supply means 14 at one end. The ICP supply means 14 comprises a plasma torch 16 which receives atomized sample solution from a nebulizer 18 and an inert carrier gas such as argon from an argon supply 20, the argon supply 20 also supplying argon to the nebulizer 18 which receives sample solution from a container 22. The plasma torch 16 is surrounded by a coil 24 which receives RF voltage from an ICP RF power supply 26.

The quadrupole tube 12 contains four pole rods 28 which receive RF voltage and DC voltage from an RF/DC supply 32. The spectrometer has a receiving chamber 34 having a detector 36 which is connected to detecting and indicating means 38. The quadrupole tube 12 also has at least one side outlet 40 connected to vacuum means (not shown) for evacuating the system.

The quadrupole electronics including the RF/DC supply 32 are contained within a cabinet or housing 30. The detecting and indicating means 38 are part of other electronic components 39 to the housing 30. A first cooling fan 40 is located in a duct 42 in the housing 30 to enable room air to be blown over the RF/DC supply 32, and a second cooling fan 44 is located in a duct 46 in the housing 30 to enable room air to be blown over the other electronic components 39.

As so far described, the ICP quadrupole mass spectrometer is conventional and operates in a manner known to a person skilled in the art. Briefly, the sample solution to be analyzed in container 22 is atomized by nebulizer 18, and the atomized spray passes into the plasma torch 16 where the ICP RF power produces plasma which passes into the quadrupole tube 12, the DC and RF fields imposed upon the quadrupole rods 28 are set to the required values so that only ions of a predetermined mass to charge ratio whose presence is being tested passes through to the receiving electrode 36, where the receipt of such ions and their concentration is detected and indicated by detecting and indicating means 38.

As mentioned in the opening paragraphs of this application, it has been unexpectedly discovered that, to obtain acceptably reproducible results, it is necessary to control the temperature of the electronic circuitry providing the various electric field in the quadrupole tube 12, especially the quadrupole RF/DC supply 32.

For example, initial tests were carried out with a sample solution containing 1 ppm (1 mg/L of thorium with the equipment being located in an air-conditioned laboratory, the air-conditioning being capable of maintaining the temperature of the room within one centigrade degree range. It was surprisingly found that the count rate for the 1 ppm thorium solution varied with temperature variations within one degree.

FIG. 2 shows variations in the thorium count for a 90 minute period at mid-day. The room temperature cycled with a period of about 7 to 8 minutes with an amplitude of about 0.5° C. There was also a slight upward shift of temperature over this period so that the overall range in temperature was from 22.06° C. to 22.96° C.

It will be seen that the thorium count varied according to temperature. In accordance with normal procedure, the count data are expressed as a percentage of the count obtained at a time close to the middle of the time period, i.e. 12.31 p.m. in this case. Taking the central portion of FIG. 2, it will be seen that the thorium count ranged from 96% to about 111%, with a temperature variation of from about 22.2° C. to about 22.95° C. Thus, a temperature variation of 0.75° C. produced a count variation of 15%, with the temperature sensitivity therefore being 20% per degree centigrade.

When repeating this test with other elements in the sample solution, it was also unexpectedly discovered that the greater the mass of the element being detected, the greater the temperature sensitivity of the equipment.

It was then discovered that the quadrupole RF/DC supply 32 was sensitive to such temperature variations, the discovery being made by using a hot air blower to increase the incoming air temperature in the cooling duct 42. In accordance with a preferred embodiment of the invention therefore, as shown in FIG. 1A, it was decided to control the temperature of air entering the fan 40 by means of a temperature controller 48 with both heating and cooling units so that the temperature of the air entering the fan was independent of room temperature and could be set to ±0.01° C., the temperature controller 48 being controlled in dependence on a signal from a temperature sensor 50 just downstream of the fan 40.

The effectiveness of the temperature controller 48 was monitored by placing a thermocouple (not shown) in the duct 42 just before the quadrupole RF/DC supply 32. The thermocouple was read on a strip chart recorder whose pen at maximum sensitivity moved 13.0 mm for a 1.0° C. change. During subsequent tests, the strip chart trace remained within the 1.0 mm range, thus indicating that the temperature of the air entering the quadrupole RF/DC supply 32 was being held within a range of no more than 0.07° C. It was believed that in fact the control was probably within the range of 0.05° C., i.e. ±0.025° C.

For these tests, a solution containing 1 ppm (1 mg/L) each of magnesium, silver, barium, cerium and thorium was used. Counts for each of these elements were measured with the air temperature in duct 42 at measured values in the range of from 22.4° C. to 31.3° C. The results are shown in FIG. 3, which clearly shows the sensitivity of the quadrupole RF/DC supply 32 to temperature with such temperature sensitivity increasing with increasing mass of the element being detected. Surprisingly, as shown in FIG. 4, plotting the logarithm of the temperature sensitivity against the logarithm of the isotopic mass gave a straight line.

In other tests, the slope of the line varied, it being believed that this was due to different settings of the quadrupole lenses. However, in all studies there was a clear linear relation between air temperature in quadrupole RF supply duct 42 and the logarithm of the counts. This was found to be true for magnesium, rhodium, cerium, bismuth, scandium, silver, terbium, thorium, cobalt, barium and thulium. The reason for such dependence on temperature sensitivity upon isotopic mass is not understood.

It was then found that further improvements were obtained by controlling the temperature in the other duct 46 supplying air to the other electronic components 39 including electrode bias supplies and the detecting and indicating means 38. The housing 30 was therefore modified by causing air flow through the first duct 42 over the quadrupole RF/DC supply 32 to pass through what was in effect an extension 42*a* of the duct 42 out of a housing outlet 52 instead of being discharged into the general interior of the housing 39 with the air from duct 46 as before. Also, a temperature controller 54 similar to the temperature controller 48 was positioned in duct 46 just before the fan 44 with a signal probe 56 being located just after the fan 44. Air passing through duct 46 would therefore pass as before over the other electronic components 39 including the detecting and indicating means 38, leaving the housing 30 through outlet 53.

For further tests, temperatures in both ducts 42, 46 were monitored by thermocouples (not shown), the tests were carried out with a soluiton containing 1 ppm (1 mg/L) each of magnesium, rhodium, bismuth, cobalt, terbium and thorium and with different duct temperatures. The results are shown in FIGS. 5 and 6 which give the results for thorium and rhodium respectively. In FIGS. 5 and 6, the reference to "DUCT" is a reference to quadrupole RF supply duct 42, and the reference to "CABINET" is a reference to the duct 46 supplying air to the other electronic components 39, including the detecting and indicating means 38.

Surprisingly, it was found that temperature sensitivity decreases linearly with increasing air temperature in duct 46, this being the opposite to the effect in RF duct 42. Also, with temperature variations in duct 46, although there was a general increase in temperature sensitivity with increase in isotopic mass there was no obvious linear relationship as there was with respect to the temperature sensivity of the RF/DC supply 32.

With the two temperature controllers 48, 54 installed, a series of precision-testing runs were made using solutions containing a number of elements, each with a concentration of 1 ppm (1 mg/L).

The conditions for each run were as follows:

Mass Range : 5 to 249 a.m.u.
Number of Channels : 2048
Dwell time per channel : 577 micro-seconds
Number of sweeps : 50
Total run time : 59.08 seconds For each test, a series of 15 runs was made but only the last ten runs were used to calculate average, the standard deviation and the %RSD. This was done because the RF/DC supply 32 heats up quite rapidly over the first few sweeps, especially when scanning the higher mass numbers. The initial five runs in each set therefore allowed the temperature of the RF supply 32 to stabilize. The results are shown in Tables 1, 2 and 3. In these Tables, the reference to "DUCT" is a reference to quadrupole RF supply duct 42, and the reference to "CABINET" is a reference to the duct 46 supplying air to the other electronic components 39, including the detecting and indicating means 38.

TABLE 1

| | Counts and Precisions obtained with lenses optimised at Mass 9 (Be) | | | | | |
|---|---|---|---|---|---|---|
| | DUCT = 23.0° C. CABINET = 23.0° C. | | | DUCT = 29.0° C. CABINET = 23.0° C. | | |
| Elements | Average | St. Dev. | % RSD | Average | St. Dev. | % RSD |
| Be 9 | 9,311 | 168 | 1.81 | 8,862 | 110 | 1.25 |
| Mg 24 | 49,922 | 497 | 1.00 | 49,959 | 614 | 1.23 |
| Sc 45 | 87,099 | 589 | 0.68 | 94,311 | 965 | 1.02 |
| Co 59 | 88,900 | 845 | 0.95 | 99,455 | 907 | 0.91 |
| As 75 | 21,172 | 217 | 1.02 | 24,596 | 321 | 1.30 |
| Rh 103 | 81,600 | 474 | 0.58 | 97,361 | 468 | 0.48 |
| Tb 159 | 84,141 | 562 | 0.67 | 112,373 | 777 | 0.69 |
| Tm 169 | 81,377 | 399 | 0.49 | 111,381 | 987 | 0.89 |
| Bi 209 | 43,905 | 218 | 0.50 | 63,621 | 541 | 0.85 |
| Th 232 | 54,257 | 504 | 0.93 | 81,735 | 534 | 0.65 |
| | Average % RSD | | 0.86 | Average % RSD | | 0.93 |

TABLE 2

| | Counts and Precisions obtained with lenses optimised at Mass 169 (Tm) | | | | | |
|---|---|---|---|---|---|---|
| | DUCT = 23.0° C. CABINET = 23.0° C. | | | DUCT = 29.0° C. CABINET = 23.0° C. | | |
| Elements | Average | St. Dev. | % RSD | Average | St. Dev. | % RSD |
| Be 9 | 8,914 | 188 | 2.11 | 8,975 | 218 | 2.43 |
| Mg 24 | 50,725 | 771 | 1.52 | 52,000 | 1,203 | 2.31 |
| Sc 45 | 116,108 | 1,987 | 1.71 | 125,317 | 2,371 | 1.89 |
| Co 59 | 145,054 | 1,813 | 1.25 | 158,332 | 2,144 | 1.35 |
| As 75 | 45,411 | 924 | 2.04 | 51,764 | 940 | 1.82 |
| Rh 103 | 230,942 | 3,529 | 1.53 | 273,217 | 4.658 | 1.70 |
| Tb 159 | 310,552 | 2,623 | 0.84 | 412,652 | 3,768 | 0.91 |
| Tm 169 | 305,796 | 2,240 | 0.73 | 420,094 | 4,012 | 0.95 |
| Bi 209 | 174,742 | 1,312 | 0.75 | 256,989 | 2,988 | 1.16 |
| Th 232 | 215,194 | 2,178 | 1.01 | 328,493 | 3,452 | 1.05 |
| | Average % RSD | | 1.35 | Average % RSD | | 1.56 |

TABLE 3

| | Counts and Precisions obtained with lenses optimised at Mass 209 (Bi) | | | | | |
|---|---|---|---|---|---|---|
| | DUCT = 23.0° C. CABINET = 23.0° C. | | | DUCT = 29.0° C. CABINET = 23.0° C. | | |
| Elements | Average | St. Dev. | % RSD | Average | St. Dev. | % RSD |
| Be 9 | 3,547 | 69 | 1.94 | 3,674 | 56 | 1.52 |
| Mg 24 | 16,855 | 162 | 0.96 | 18,376 | 130 | 0.71 |
| Sc 45 | 48,537 | 420 | 0.87 | 53,405 | 444 | 0.83 |
| Co 59 | 69,490 | 700 | 1.01 | 76,727 | 826 | 1.08 |
| As 75 | 24,202 | 359 | 1.48 | 27,727 | 244 | 0.88 |
| Rh 103 | 168,679 | 1,702 | 1.01 | 200,000 | 2,152 | 1.08 |
| Tb 159 | 375,104 | 2,377 | 0.63 | 484,414 | 3,873 | 0.80 |
| Tm 169 | 403,972 | 2,574 | 0.64 | 533,758 | 3,409 | 0.64 |
| Bi 209 | 300,139 | 2,689 | 0.90 | 421,149 | 2,441 | 0.58 |
| Th 232 | 412,667 | 2,625 | 0.64 | 597,240 | 4.017 | 0.67 |
| | Average % RSD | | 1.01 | Average % RSD | | 0.88 |

From the above Tables, it will be seen that the precision obtained for the ten elements concerned was about 1% RSD.

The advantages of the present invention are therefore readily apparent from the foregoing description. Although the preferred embodiment is concerned with ICP quadrupole mass spectrometer, the invention is also applicable to other types of quadrupole mass spectrometer, for example a microwave induced plasma (MIP) quadrupole mass spectrometer used predominantly for quantitative analysis. Other embodiments will be apparent to a person skilled in the art, the scope of the invention being defined in the appended claims.

What I claim as new and desire to protect by Letters Patent of the U.S. is:

1. A quadrupole mass spectrometer comprising a housing containing pole rods defining a passage through which ions can pass when the housing is evacuated, means for applying ions to said passage, RF voltage supply means for supplying RF voltage to said pole rods to cause ions only of a predetermined mass/charge ratio to pass through said passage, means for receiving ions which have passed through said passage, electrical means for detecting and indicating the rate of receipt of ions of said predetermined mass/charge ratio by said ions receiving means, and means for controlling the termperature of said RF supply means, said temperature control means comprising means for passing air over said RF supply means, said temperature control means comprising means for passing air over said RF supply means and means for maintaining the temperature of said air to within ±0.05° C. of a specified temperature.

2. A quadrupole mass spectrometer according to claim 1 including means for causing air passed over the RF supply means to pass directly to the atmosphere without passing over other electronic components.

3. A quadrupole mass spectrometer according to claim 2 also comprising second air flow means separate from said first mentioned air flow means for passing air over other electronic components, and means for maintaining the temperature of said air passed over said other electronic components to within ±0.05° C. of a specified temperature.

4. A quadrupole mass spectrometer according to claim 1 wherein said means for supplying ions to said passage comprises inductively coupled plasma supply means.

5. A quadrupole mass spectrometer according to claim 1 wherein said temperature maintaining means maintains the temperature of said air passed over said RF supply means to within ±0.025° C. of the specified temperature.

* * * * *